March 19, 1957  F. S. LAPEYRE ET AL  2,785,435
APPARATUS FOR PEELING AND SEPARATING SHRIMP
Filed March 22, 1955  4 Sheets-Sheet 1
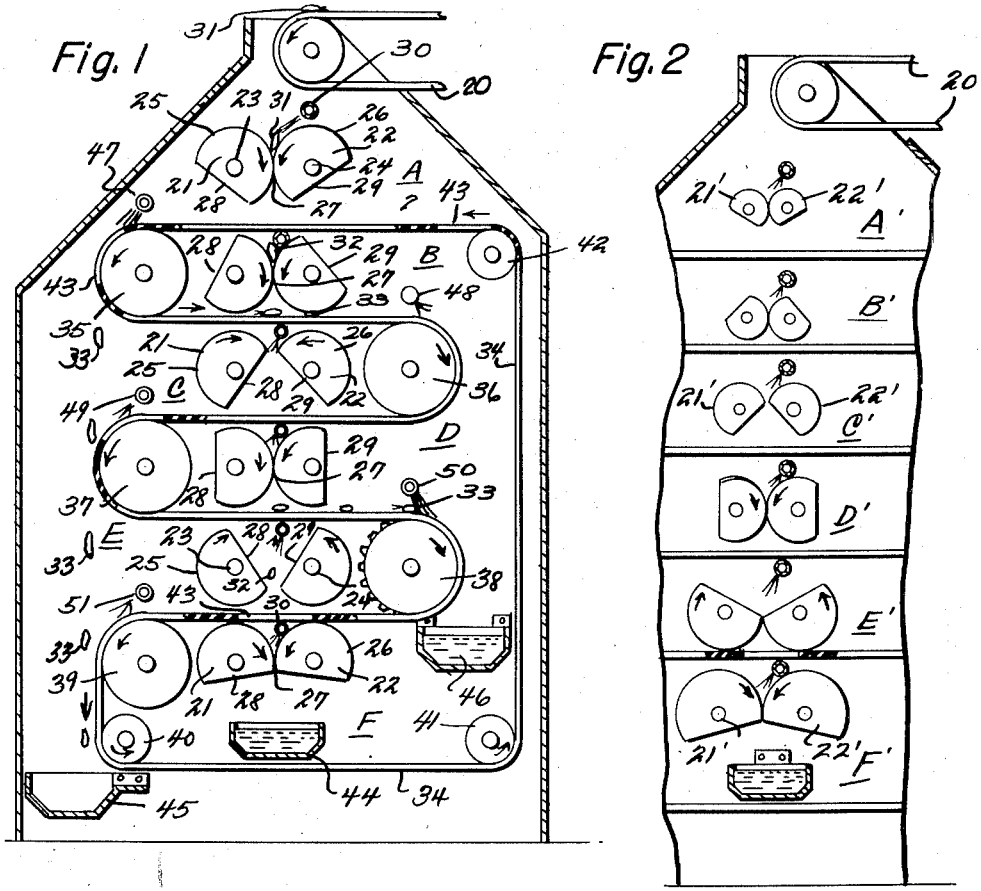
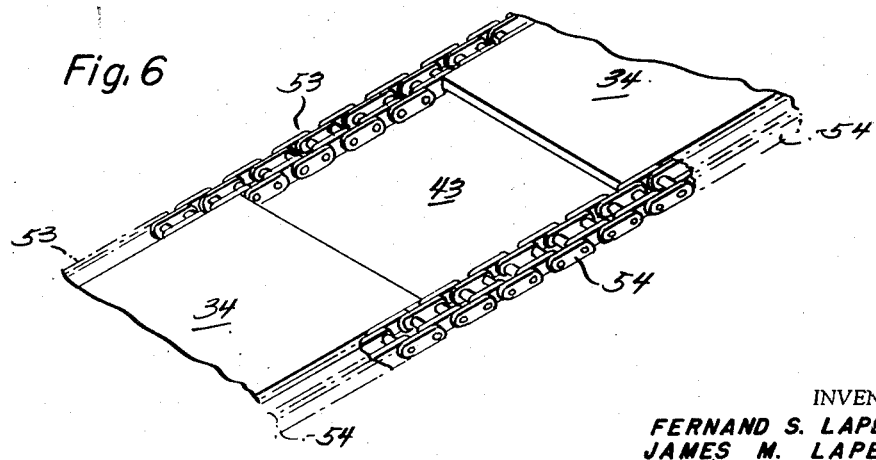
INVENTORS
FERNAND S. LAPEYRE
JAMES M. LAPEYRE
BY Wilkinson & Mawhinney
ATTORNEYS March 19, 1957     F. S. LAPEYRE ET AL     2,785,435
APPARATUS FOR PEELING AND SEPARATING SHRIMP
Filed March 22, 1955     4 Sheets-Sheet 2
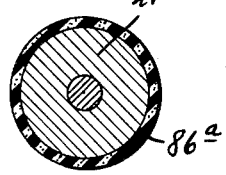
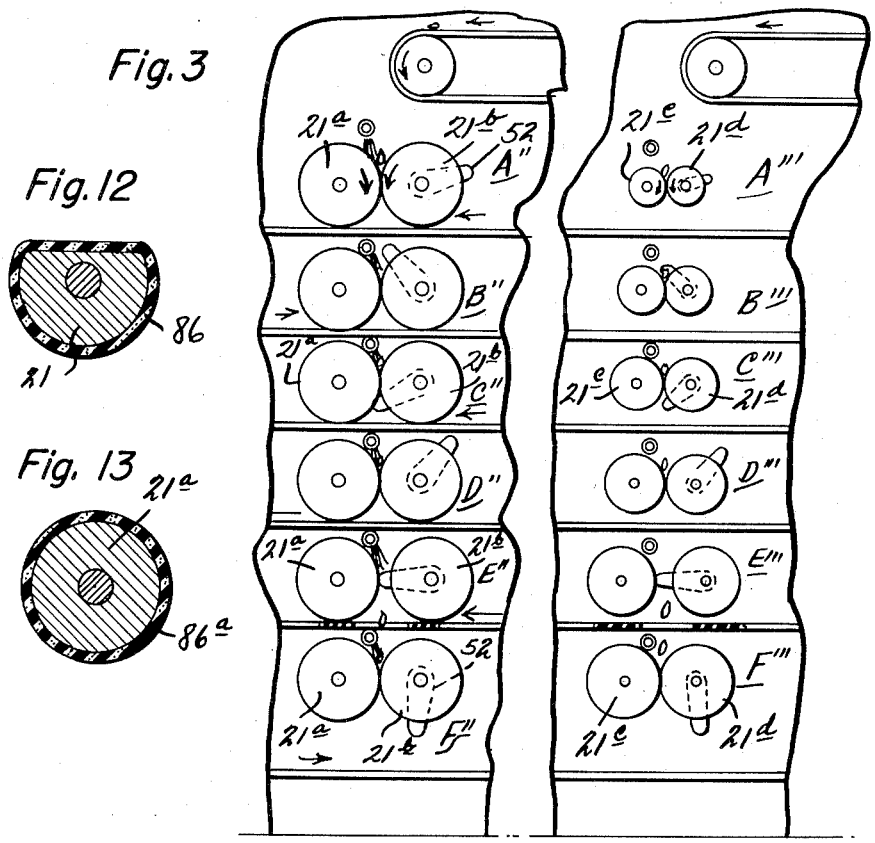
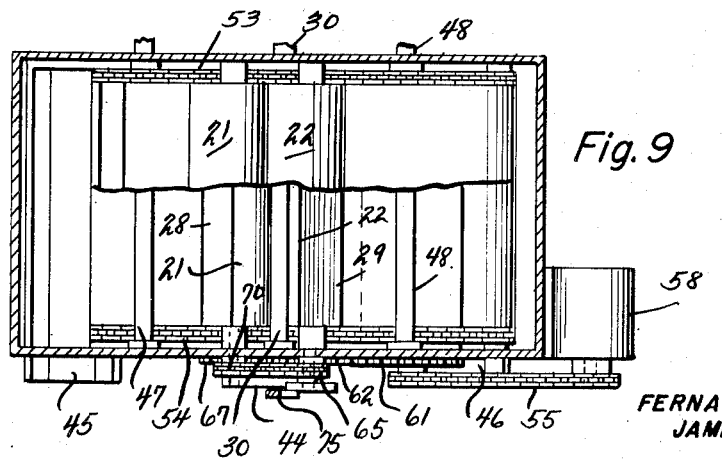
INVENTORS
FERNAND S. LAPEYRE
JAMES M. LAPEYRE
ATTORNEYS March 19, 1957   F. S. LAPEYRE ET AL   2,785,435
APPARATUS FOR PEELING AND SEPARATING SHRIMP
Filed March 22, 1955   4 Sheets-Sheet 3

INVENTORS
FERNAND S. LAPEYRE
JAMES M. LAPEYRE
BY Wilkinson & Maw Kinney
ATTORNEYS March 19, 1957 F. S. LAPEYRE ET AL 2,785,435
APPARATUS FOR PEELING AND SEPARATING SHRIMP
Filed March 22, 1955 4 Sheets-Sheet 4
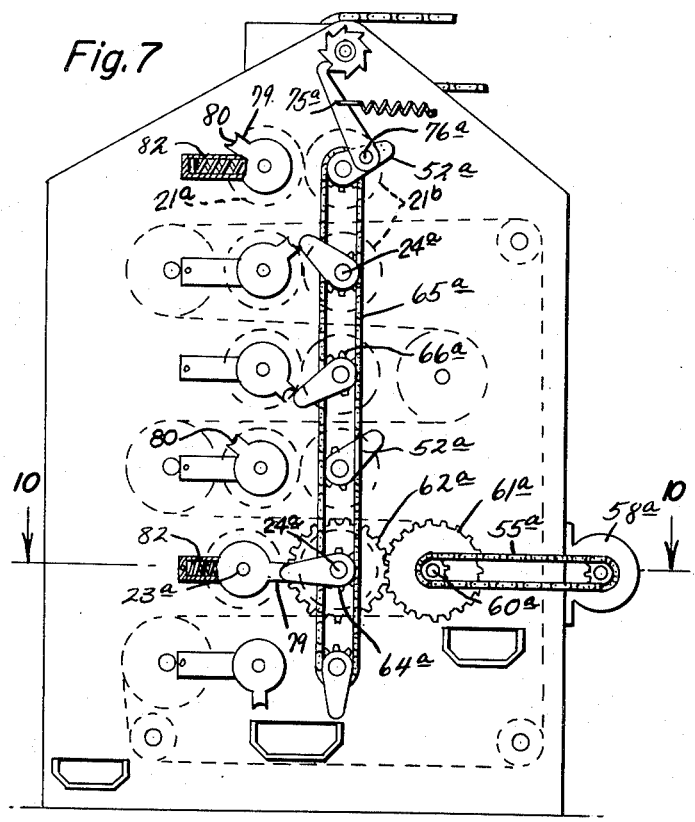
Fig. 7
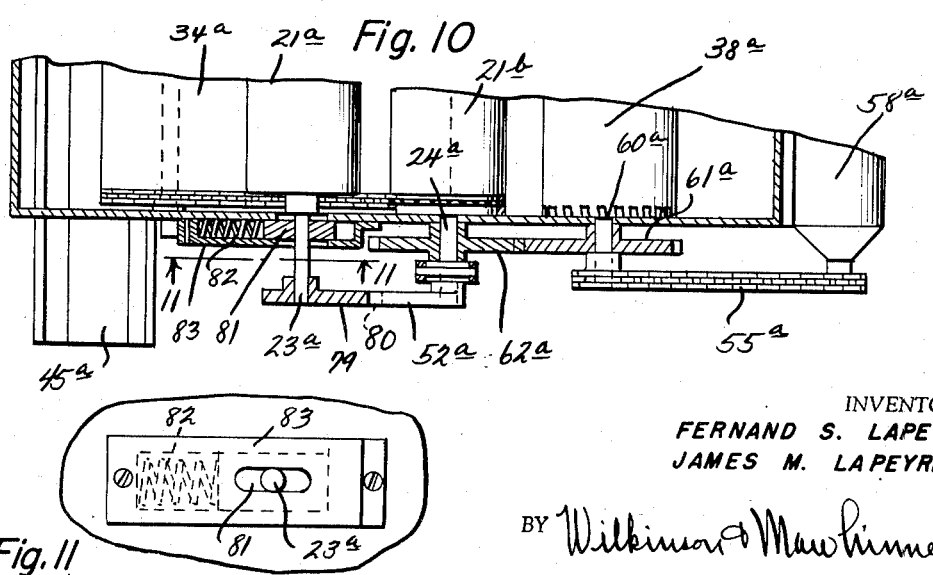
Fig. 10
Fig. 11
INVENTORS
FERNAND S. LAPEYRE
JAMES M. LAPEYRE
BY Wilkinson & MawKinney
ATTORNEYS

United States Patent Office 2,785,435
Patented Mar. 19, 1957

2,785,435

APPARATUS FOR PEELING AND SEPARATING SHRIMP

Fernand S. Lapeyre and James M. Lapeyre, New Orleans, La., assignors to The Peelers Company, Houma, La., a partnership Application March 22, 1955, Serial No. 495,889

17 Claims. (Cl. 17—2)

The present invention relates to apparatus for peeling and separating shrimp and more particularly relates to a machine for the accurate and complete separation of the hulls or shells from shrimp meat in an automatic and simple operation.

Another object of the invention is to provide an apparatus or machine in which the hulls are separated from the meat incident to the peeling operation with means to dispose of the shells or hulls and to deliver the separated meat to a separate destination.

A further object of the invention is to provide in an apparatus of the character indicated a succession of peeling stations situated one above another so that shrimp meat may be enabled to drop from a higher to a next lower station at stated intervals in the course of the operation of the apparatus to the end that the shrimp may be subjected to repeated peeling operations which will result in a more valuable final product, the gravity delivery of the meat from one station to another seriatim being rapid and attended with little expense in the operational cost.

A still further object of the invention is to provide an apparatus for peeling and separating shrimp in which means is provided between the various stations to intercept the hulls which are drawn down incident to the peeling operation, such means being withdrawn at stated intervals for the passage of the shrimp meat from one station to another.

It is a still further object of the invention to provide an apparatus for peeling and separating shrimp in which a pair of peeling rollers are provided at each station associated to form a peeling nip therebetween for the pinching or squeezing of the meat from the hulls while drawing the hulls downwardly through the peeling rollers for delivery to a conveyor belt or some other means by which the hulls are conveyed off separately from the meat, the meat being slippery and bulky being rejected by the peeling rollers and prevented from descending through the nips until such time as gaps are formed between the peeling rollers, at which time the conveyor belt is withdrawn, or an opening in the conveyor belt is presented below the gap to permit the passage of meat through the gap from an upper station downwardly to the nip between the rollers of the next lower station.

The invention also contemplates the application of water sprays or some other lubricant to facilitate the passage of both the hulls and the shrimp meat through the apparatus and to their separate destinations while also tending to cleanse the surfaces of the peeling rollers and the conveyor to maintain the same at all times at efficiency peak of operation.

A still further object of the invention is to provide an apparatus for peeling and separating shrimp in which drive apparatus is provided for the conveyor and the several pairs of peeling rollers at the various stations to relate the openings in the belt to the gaps periodically produced between the pairs of peeling rollers so that a timed relationship is set up in which the openings of the conveyor belt are presented below the nips when such nips are widened into gaps for the passage of the shrimp meat.

A still further object of the invention is to provide an apparatus for peeling and separating shrimp in which the diameters of the peeling rollers at the several stations may be varied to change the angle of attack whereby both large and small shrimp may be effectively dealt with and peeled and whereby the hulls may be dislodged and removed from thin and thick and from small and large parts of the shrimp.

The invention contemplates a more successful peeling of shrimp without injuring the meat thereof or in any way depreciating its market value, but on the other hand, to enhance the value of the ultimate meat product owing to the fact that it has been completely stripped of all shell or hull parts, the presence of which detracts from the saleability of the end product.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is an end elevational view of one form of apparatus for peeling and separating shrimp constructed in accordance with the present invention.

Figure 2 is a similar view with parts broken away showing a modified form in which the rollers are of progressively increasing diameters from the top to the bottom stations.

Figure 3 is also an end elevational view with parts broken away of another form of apparatus for peeling and separating shrimp in which continuously round rollers are employed with means to separate the rollers periodically to provide the gaps through which the shrimp meat drop.

Figure 4 is a view similar to Figure 3 in which the continuously round rollers progress in diameter from the top to the bottom stations.

Figure 6 is a fragmentary view of a form of conveyor employed to remove the hulls.

Figure 7 is an end elevational view of an operating mechanism more particularly applicable to the form of invention shown in Figures 3 and 4.

Figure 9 is a horizontal section taken on the line 9—9 of Figure 8.

Figure 10 is a fragmentary horizontal section taken on an enlarged scale on the line 10—10 of Figure 7.

Figure 11 is a fragmentary vertical sectional view taken on the line 11—11 of Figure 10.

Figure 12 is a cross sectional view of a form of peeling roller of segmental type.

Figure 13 is a cross sectional view of a modified form of completely circular peeling roller.

Figure 5:
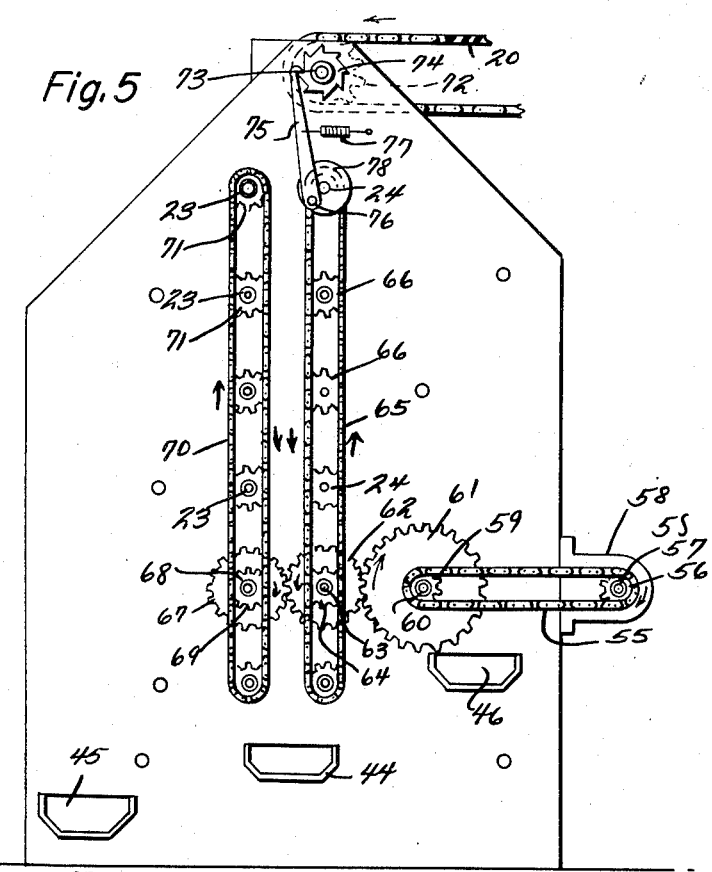
Figure 5 is an end elevational view showing one form of drive apparatus applicable more particularly to the forms of peeling rollers shown in Figures 1 and 2.
Figure 8:
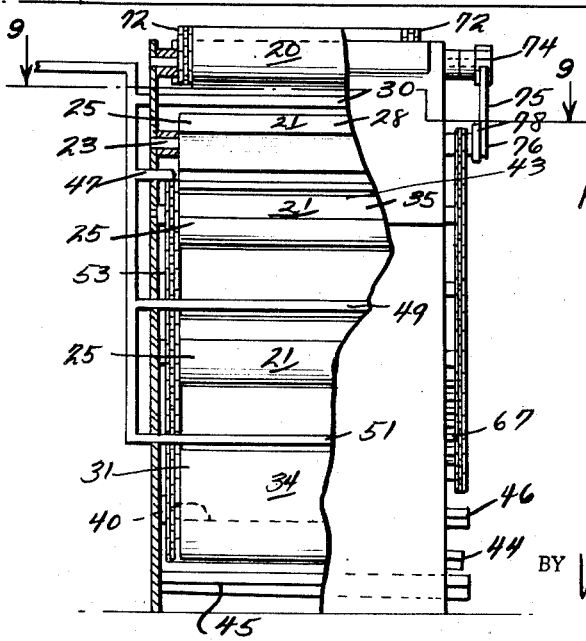
Figure 8 is an end elevational view taken from the left hand end of Figure 5 shown on a reduced scale and having parts broken away and parts shown in section.

Referring more particularly to the drawings, and for the present to Figure 1, 20 designates a supply conveyor upon which shrimp from a suitable source of supply are delivered to a position directly over the uppermost of a number of peeling stations arranged in a vertical series one above another. In the embodiment of the invention shown in Figure 1, six such stations are shown denominated A, B, C, D, E, and F although two such stations may constitute a unit, and any number of stations above two may be employed.

Each station contains a pair of rollers 21, 22 mounted upon shafts 23 and 24 for angular movement in the direction indicated by the arrows. The rollers 21, 22 have curvilinear surfaces 25, 26 which contact or closely approach one another to form a nip 27. In the form of the invention shown in Figure 1, in order to widen the nip 27 into a gap at certain predetermined angular positions of the rollers 21, 22, such rollers are provided with cut-away portions 28, 29.

The rollers of one station are set in one angular position, while the rollers 21, 22 of a next lower station B are set angularly in a different order than the rollers of station A so that the rollers of station B are in nip position when the rollers of station A are in gap position; otherwise the peeled meat would drop completely through the gap in the station B from station A and no peeling operation would be performed upon the shrimp in station B.

A roller lubricating water line 30 located above and to one side of the nips 27 of the rollers of the various stations may consist of a perforated pipe extending substantially parallel with the axes of the rollers and in communication with a suitable water or other liquid supply for spraying liquid upon the surfaces of the rollers 21, 22 in and about the nips 27.

The unpeeled whole shrimp is indicated at 31 on the supply conveyor 20, which whole shrimp is adapted to be delivered to the nip 27 of station A. The shrimp meat is designated at 32 and the separted hulls or shells at 33. The latter are adapted to be pulled down between the rollers 21, 22 and deposited upon a conveyor 34 which is preferably in the form of an endless belt.

The endless belt is trained over a number of staggered conveyor rollers 35, 36, 37, 38, and 39 and about idler corner rollers 40, 41 and 42, the arrangement being such that the top run of the conveyor belt 34 moves through the space between stations A and B in position to catch the hulls 33 from the peeling operation of station A while subsequent lower horizontal runs of the conveyor belt 34 pass respectively between stations B, C; C, D; D, E; and E, F.

The conveyor belt 34 is provided with openings or slots 43 in spaced relation along its length corresponding to linear travel of the surfaces 25, 26 and 28, 29 of the peeling rollers 21, 22, the same being in such timed relation that whereas the belt runs are always beneath the nips 27 to receive the hulls 33, whenever the nips 27 are broadened into the gaps, the removed portions or openings 43 of the conveyor will have arrived directly beneath such gaps so that the runs of the conveyor belt do not interfere with the dropping of the peeled meat 32 through the gaps and into the nips of the next lower station. In other words the conveyor belt or a movable member 34 is removed from beneath the upper peeling rollers when such upper peeling rollers are in gap relation to permit the meat to drop down through the gap into the nip of the next lower pair of peeling rollers.

A meat retrieving trough 44 is disposed below the nip-gap of the lowermost station F in position to receive the peeled meat from the apparatus; while huil discharge troughs 45, 46 are located respectively just outside the vertical line of rollers 35, 37, 39 on the one hand, and 36, 38 on the other.

Belt wash water lines 47, 48, 49, 50, and 51 are located at strategic points in order to wash the hulls 33 off the belt 34 where the belt commences to turn around a roller support. These wash water lines are also preferably in the form of perforated pipes in which the perforations direct sprays of water or other liquid outwardly of the conveyor runs at the points indicated. The position and the direction of these water sprays is such that the hulls 33 will be washed clear of the conveyor belt in a position to fall directly into one or the other of the troughs 45, 46.

Referring more particularly to Figure 2, the form of the invention herein is identical with that illustrated and described in connection with Figure 1 with the exception that the rollers 21', 22' of the several stations are of differential diameters. That is, the rollers of the first station A' are of smaller diameter than the rollers of any of the other stations. The rollers of station B' are of larger diameter than the diameter of the rollers of station A' and so on through stations C', D', E' and F' the rollers are of progressively larger diameters. Such rollers present different angles of attack to the shrimp. While the rollers 21', 22' in Figure 2 are shown to progress in diameter in a direct arithmetical order from the top station A' where the rollers are of smallest diameter to the lowermost station F' where the rollers are of greatest diameter, it will be understood that such order is not essential to the invention but the order may be varied so that a station of smaller angle of attack may succeed a station having rollers of larger angle of attack.

Referring more particularly to Figure 3, the rollers 21$^a$ and 21$^b$ are continuously circular with one of the rollers 21$^b$ movable bodily away from the companion roller 21$^a$ as indicated at station E" in order to form a gap through which the meat may drop. The rollers may be urged together by spring pressure as hereinafter described and opened by roller operating cams 52 affixed to the rollers 21$^b$ and engaging against parts or surfaces or members carried by the companion rollers 21$^a$.

Referring more particularly to Figure 4, the arrangement therein shown is similar to that shown in Figure 3 except for that fact that the pairs of rollers 21$^c$ and 21$^d$ in the several stations A''', B''', C''', D''', E''' and F''' are of differential diameters, for instance, of progressively larger diameters from the top to the bottom station in order to vary the angles of attack upon the shrimp.

Referring more particularly to Figure 6, the belt 34 may be of woven wire, rubber, perforated rubber or the like which is attached in any suitable manner to side chains 53 and 54. The belt may be interrupted at 43 as by providing a space, opening or slot through which meats fall in synchronism with the rollers.

Referring more particularly to Figure 5, a drive suitable for the forms of inventions shown in Figures 1 and 2 is illustrated in which 55 indicates a chain drive. The chain drive 55 is entrained with a sprocket 56 on a shaft 57 of a gear reduction unit 58 driven by an appropriate motor (which is not shown). The driven sprocket 59 of the chain drive is fast on a shaft 60 to which is splined or otherwise secured a gear wheel 61 meshing with a companion gear wheel 62 on a shaft 63. A sprocket 64 is also affixed on the shaft 63 and driven thereby, which sprocket 64 engages both sides of an endless chain 65 which drives all of the sprockets 66 on the shafts 24 of the peeling rollers 22 of all of the stations.

The gear wheel 62 also meshes with the gear wheel 67 on a shaft 68 to which a sprocket 69 is affixed for driving the endless chain 70 entrained with all of the sprockets 71 mounted on the shafts 23 of the rollers 21.

Due to the gear arrangement, the peeling rollers will be driven in relatively opposite directions as shown by the arrows.

The shaft 60 may be that of the conveyor roller 38 so that this conveyor roller 38 carries sprockets which mesh with the side chains 53, 54 of the conveyor belt 34.

The arrangement of Figure 5 also shows an intermittent drive for the supply conveyor 20. This drive may consist of drive sprockets 72 engaged with the supply conveyor 20, such drive sprockets 72 being made fast to the shaft 73 to which is also made fast a ratchet wheel 74 adapted to be driven by a drive pawl 75 having a pivot 76 connecting the same eccentrically to the disc 78 or to some other rotary member affixed to the uppermost shaft 24 and thus driven concurrently with the peeling rollers whereby the whole shrimp 31 will be delivered by the conveyor 20 in timed relation to the rollers 21, 22 so that the whole shrimp is always delivered to the nip 27 and never to the gap. A spring 77 maintains the pitman-pawl 75 in engagement with the inclined teeth of the ratchet wheel 74. This is a well-known type of Geneva movement.

Referring more particularly to Figures 7, 10 and 11 a drive chain 55a driven by gear reduction unit 58a is arranged to drive shaft 60a to which gear wheel 61a is affixed. Gear wheel 61a drives gear wheel 62a which is fast upon shaft 24a of roller 21b.

Cam arms 52a are affixed to the shafts 24a and are positioned to engage arms 79 affixed to the shafts 23a of rollers 21a.

The arms 79 are provided with sockets 80 at their outer free ends to receive the rounded free ends of the cam arms 52a. The shafts 23a are carried in slidable bearing blocks 81 engaged by coil springs 82 which expand in the direction to yieldably move the roller 21a up against its companion roller 21b to provide a yieldable peeling nip between these rollers.

The arrangement shown in Figure 10 can if desired be duplicated at the opposite side of the machine. The bearing blocks 81 may be arranged to slide in guide casings 83 affixed in any appropriate manner to frame portions of the machine.

The chain drive 55a, through shaft 60a will drive the roller 38a and thus impart movement to the endless conveyor 34a.

This drive 55a also imparts movement to the various rollers at the several stations through the gears 61a and 62a, which latter drives the pinion 64a and thus drives the chain 65a which drives all of the pinions 66a common to the various shafts 24a.

As the right vertical bank of rollers 21b are driven, they, in turn, will drive the rollers 21a of the left bank of rollers by contact therewith. When the rollers of each bank are not respectively in contact the left bank rollers will be driven by the cams 52a affixed to the shafts 24a of the right bank rollers, when said cams engage cam sockets 79, 80 affixed to the shafts 23a of the rollers 21a of the left bank.

The common drive source 55a, will also drive the supply conveyor through the ratchet device. In this instance the pawl arm 75a will be pivoted at 76a to the uppermost cam arm 52a. Thus the common drive 55a will drive the supply conveyor in timed relation to the upper rollers 21a, 21b so that shrimp is delivered to the upper pair of rollers only when these rollers are in nip position.

Through the common drive means 55a, the three agencies are coordinated, these agencies including the supply conveyor which is thereby timed to deliver shrimp to the uppermost pair of rollers only when these rollers are in nip position, the second agency being the rollers themselves which are driven in a timed relation with respect to the rollers of the other stations whereby gap positions of an immediately upper station are coordinated with nip positions of the station immediately below, and the third agency being the belt or trash conveyor which is so timed in its movement that during nip peeling positions of an upper set of rollers the belt is arranged below the nip to receive the hulls and shells and to dispose of the same at the side of the machine, whereas during gap occurrences of upper pairs of rollers the run of the belt below will present an opening so that the peeled meat may drop from the gap and into the nip below.

The chain 65a will possess sufficient looseness to permit of the slight deflection incident to the movement of the slidable bearings 81 which entrain the shafts 23a and the rollers 21a therewith.

Where one roller 21a of each pair is yieldably urged against its companion roller 21b, as shown in Figures 7 and 10 by the springs 82, the rollers may move slightly apart to receive the hulls and shells of the shrimp therethrough. In the case of Figures 1, 2, 3 and 4 where no spring pressure is provided, the rollers 21, as shown in Figure 12 or the round rollers 21a, as shown in Figure 13, may be coated or otherwise provided with a yieldable envelope 86, 86a which will not only yield but in being so compressed will exert a greater grasping action upon the hulls.

In operation, whole shrimp or shrimp from which the heads and tails have been removed but not the hulls or shells, are delivered by the conveyor 20 to the nip of the uppermost pair of rollers 21, 22 at the top station A. Here the shrimp are subjected to the peeling action incident to the rotation downwardly together of the curved surfaces 25, 26 of the rollers 21, 22. These rollers have a pinching or squeezing action or in some instances they have a grasping and an unwrapping action as described in column 4 of Patent 2,537,355 granted June 9, 1951. The squeezing and pinching action is also described in column 5 of Patent 2,574,044 granted November 6, 1951. The expelled meat is slippery and therefore it is not readily caught by the surfaces of the rollers and it will consequently be rejected by the nips and maintained upwardly above the nips. The lubricating action of the water sprays is also conducive to this end so that the flattened hulls and shells after the meat has been expelled therefrom are readily drawn down through the nips of the rollers and deposited upon the conveyor below.

At stated intervals when the nips are broadened into the gaps, meat which has been held above the nips will be permitted to descend through the large gaps and through the openings in the conveyor belt to the rollers of the next lower station which will be in nip position to receive the same.

The rollers may be of any desired axial length, for instance narrow rollers to reach into the natural curvature of a shrimp in order to come into contact with the feet, gristle, swimmerettes and other appendages protruding from the underside of the shrimp in a manner similar to that described in columns 7 and 8 of Patent 2,637,065, granted May 5, 1953. This patent in these same columns 7 and 8 also describes the value of varied angles of attack upon the shrimp, a desideratum achieved in the present case by varying the diameters of the rolls at the various stations as shown in Figures 2 and 4 particularly.

By subjecting the shrimp to repeated shelling operations in a plurality of stations all particles of hull will be finally removed thus yielding a product of high commercial value. The arrangement is such that the meat will not be mutilated and will be rapidly passed from one station to another so that the machine has substantial capacity for the purpose stated.

The angular rotation of all peeling rollers is the same and the discharge of peeled shrimp from each peeling stage will be at the same time interval. Accordingly, it is necessary only that the number of belt gaps per minute which pass under any two discharging rollers be equal to the revolutions per minute of those rollers. Inasmuch as the belt speed is the same throughout the machine and the rollers all rotate at the same number of revolutions per minute, the number of gaps in the belt is not important so long as they are equally spaced. The important factor is the relationship of belt gaps per minute to revolutions per minute of the peeling rollers.

Although we have disclosed herein the best form of the invention known to us at this time, we reserve the right to all such modifications and changes as may come within the scope of the following claims.

What is claimed is:

1. An apparatus for peeling and separating shrimp comprising at least two pair of peeling members disposed substantially vertically above one another so that the lower pair may receive shrimp from the upper pair, each pair comprising two members having curvilinear surfaces moving downwardly in opposite directions and providing therebetween a nip for separating the meat from the hull of the shrimp and to draw the hull downwardly through the members and discharge the same below such members while rejecting the meat, a movable member between the pairs of peeling members adapted to receive the hulls from the upper pair and convey same off separately from the meat, means operatively associated with the peeling members for intermittently causing a gap to occur between the upper pair of peeling members down through which the meat may drop into the nip of the second lower pair of peeling members when the movable member is moved out of alignment with the nips of the two pair of peeling members, and means coordinated with the gap forming position of the upper pair of peeling members for removing the movable member from the vertical line between the nip when the gap appears between the upper pair of peeling members.

2. An apparatus for peeling and separating shrimp comprising at least two pairs of continuously rotating segmental members disposed substantially vertically above one another and having curvilinear surfaces to form nips therebetween to separate the hulls of shrimp from the meat and to draw the hulls downwardly through the nips, the nips of the members being disposed in substantially vertical alignment, the segmental upper members periodically during their rotation opening gaps therebetween through which the shrimp meat may drop into the nip of the second set of peeling members, a movable member disposed between the pairs of peeling members and adapted to receive the hulls from the upper nip, and means operatively associated with the movable member for moving the movable member out of the way when the gap is formed between the upper pair of peeling members so that the movable member does not interfere with the shrimp meat dropping into the nip of the lower pair of peeling members.

3. An apparatus for peeling and separating shrimp comprising an upper and a lower pair of angularly moving peeling members, each pair having curvilinear surfaces moving together downwardly to constitute a nip for the peeling of shrimp and for drawing the hulls downwardly through the nips while rejecting the more slippery meat, said upper members having cut-away portions adapted to be brought in registry incident to the angular movement of said members during pre-selected angular positions of the members to form gaps, through which the shrimp meat may drop by gravity into the nip of the lower pair of peeling members, a movable member interposed between the nips of the upper and lower members to catch the peeled hulls from the upper nip, means connected to move the movable member to discharge the hulls therefrom, and means coordinating the movements of the upper pair of peeling members and said movable member to cause the movable member to move out of the path of the descending shrimp meat when the gap is presented between the upper pair of peeling members.

4. An apparatus for peeling and separating shrimp comprising a substantially vertical series of pairs of continuously rotating peeling rollers having curvilinear surfaces for coming together downwardly to form nips for the peeling of shrimp and for drawing the separated hulls downwardly through the nips, each pair of said peeling rollers having cut-away portions adapted to be intermittently brought opposite one another to provide a gap down through which the peeled meat may drop by gravity, a conveyor having runs movable between the vertical pairs of rollers for receiving the peeled hulls from higher nips and disposing of the same, said conveyor having openings therein adapted to periodically register with the gaps so so as not to interfere with the passage of the meat from a higher gap to a lower nip, and means operatively associated with the conveyor and rollers for driving the conveyor and the peeling rollers continuously in a timed relationship to present the openings in the conveyor beneath the gaps between the next higher pair of peeling rollers.

5. An apparatus for peeling and separating shrimp comprising a series of pairs of rotary peeling members having alternate nips and gaps therebetween with the several pairs of members disposed one above another so that such nips and gaps are substantially in vertical alignment, a movable member movable between the several pairs of peeling members for receiving the hulls separated from the shrimp and pulled down by the peeling members through the nips, said movable member having openings therein to register with the gaps to permit the peeled shrimp meat to drop by gravity successively from a gap above to a nip below, and means operatively associated with the movable member and peeling members for driving said movable member and said peeling members in timed relation to present an opening in the movable member beneath a gap in an upper pair of peeling members while the pair of peeling members immediately below are in nip-forming relationship.

6. In an apparatus for peeling and separating shrimp, a pair of peeling rollers positioned relatively to define a peeling nip therebetween for receiving shrimp, and means associated with at least one of said rollers for widening the nip between said rollers upon predetermined angular rotation of said rollers for providing a gap through which the peeled shrimp may drop.

7. In an apparatus for peeling shrimp, at least two pairs of peeling rollers positioned relatively to define a peeling nip between each pair of rollers for receiving whole shrimp, one pair of rollers being situated substantially above the other pair of rollers so that meat peeled by a higher pair of rollers may drop down into the nip of a lower pair of rollers, and means associated with at least one roller of the higher pair for widening the nip between said rollers upon predetermined angular rotation of said rollers to form a gap through which the peeled meat may drop down into the nip of the lower pair of rollers.

8. In an apparatus for peeling shrimp, a pair of peeling rollers positioned relatively to define a peeling nip therebetween for receiving shrimp, means associated with at least one of said rollers for widening the nip between said rollers upon predetermined angular rotation of said rollers to permit the peeled meat to drop down between said rollers, and means operatively associated with said nip widening means for intermittently feeding shrimp to the rollers when in closed nip position.

9. In an apparatus for peeling shrimp, a pair of peeling rollers positioned relatively to define a peeling nip therebetween for receiving shrimp, and having cut away portions for widening the nip into a gap at preselected angular positions incident to the rotation of the rollers, means operatively associated with said rollers for rotating said rollers, shrimp conveying means for conveying shrimp to the peeling rollers, and means operatively associated with said conveying means for driving said shrimp conveying means in timed relation with the driving means for the rollers to assure delivery of the shrimp to the rollers only when in nip position and not in gap position.

10. In an apparatus for peeling shrimp, a pair of peeling rollers positioned relatively to define a peeling nip therebetween for receiving shrimp, one of said rollers being bodily movable relatively to its companion roller, means operatively associated with the rollers for yieldably urging the rollers together into nip position, means operatively associated with the bodily movable roller acting periodically during the rotation of the rollers to displace the bodily movable roller from nip to gap position to permit the peeled meat to drop through the gap.

11. In an apparatus for peeling shrimp, a plurality of peeling stations disposed one above another, a pair of peeling rollers at each station positioned relatively to define a peeling nip therebetween for receiving shrimp, the nips of the rollers at the various stations being substantially vertically one above another, one roller of each pair of rollers being bodily displaceable from its companion roller, yieldable means operatively associated with the rollers for urging the rollers together, means operatively associated with the rollers for displacing the bodily movable roller from its companion roller at predetermined angular positions to open the nip into a gap down through which the peeled meat from a higher station may descend to the nip of the next lower station, and means operatively associated with the rollers for driving all of said rollers and for opening the gaps only in timed relationship so that the rollers of a next lower pair at the next lower station may always be in nip position when the rollers of a next higher station are in gap position.

12. In an apparatus for peeling and separating shrimp, a plurality of peeling stations situated one above another, a pair of peeling rollers at each station positioned relatively to define a peeling nip therebetween for receiving shrimp, means associated with at least one of each of said pair of rollers for widening the nip between said rollers upon predetermined angular rotation of said rollers, to provide a gap down through which the peeled meat from an upper station may descend to the next lower station, means operatively associated with the rollers for driving the rollers at the various stations and for widening the nips between such rollers only in the relationship in which a gap will be formed at an upper station when the rollers are in nip position at the immediately lower station, a conveyor for trash having runs extending between the rollers of the several stations in position to receive the hulls drawn down between the rollers of an upper station, said conveyor having openings therein, and means for driving the conveyor coordinated with the drive means for the rollers, and the gap forming means whereby openings in the conveyor will be presented below the space between rollers of a next higher station when such rollers are in gap position, a shrimp supply means, and means for intermittently actuating said shrimp supply means coordinated with the drive means for the rollers and the trash conveyor to deliver shrimp from the supply means to the uppermost station only when the rollers thereof are in nip position.

13. In an apparatus for peeling shrimp, a pair of peeling rollers positioned relatively to define a peeling nip therebetween for receiving shrimp, means associated with at least one of said rollers for widening the nips between said rollers upon predetermined angular rotation of said rollers for providing a gap through which the peeled shrimp may drop, and watering means so disposed with relation to the rollers as to deliver liquid to the nip.

14. In an apparatus for peeling shrimp, at least two pairs of peeling rollers, each pair positioned relatively to define a peeling nip therebetween for receiving shrimp, one pair of rollers being situated substantially above the other pair of rollers so that meat peeled from a higher pair of rollers may drop down into the nip of a lower pair of rollers, means associated with at least one roller of the higher pair for widening the nip between said rollers upon predetermined angular rotation of said rollers to form a gap through which the peeled meat may drop down into the nip of the lower pair of rollers, movable means between said pairs of rollers, means operatively associated with the movable means for withdrawing the movable means from beneath the higher pair of rollers when the same are in gap position, and liquid spray means disposed above and to one side of the nips between the pairs of rollers for lubricating the peeling surfaces of the rollers and for washing down the hulls and meat.

15. In an apparatus for peeling shrimp, at least two pairs of peeling rollers positioned relatively to define a peeling nip between each pair of rollers for receiving whole shrimp, one pair of rollers being situated substantially above the other pair of rollers so that meat peeled by a higher pair of rollers may drop down into the nip of a lower pair of rollers, the rollers of one pair being of a diameter different from that of the other pair, and means associated with at least one roller of the higher pair for widening the nip between said rollers upon predetermined angular rotation of said rollers to form a gap through which the peeled meat may drop down into the nip of the lower pair of rollers.

16. In an apparatus for peeling shrimp, at least two pairs of peeling rollers positioned relatively to define a peeling nip between each pair of rollers for receiving whole shrimp, one pair of rollers being situated substantially above the other pair of rollers so that meat peeled by a higher pair of rollers may drop down into the nip of a lower pair of rollers, the rollers of the upper pair of rollers being of a diameter less than that of the rollers of the lower pair of rollers, and means associated with at least one roller of the higher pair for widening the nip between said rollers upon predetermined angular rotation of said rollers to form a gap through which the peeled meat may drop down into the nip of the lower pair of rollers.

17. In an apparatus for peeling shrimp, at least two pairs of peeling members positioned relatively to define a peeling nip between the members of each pair for receiving whole shrimp, one pair of members being situated in a plane higher than that of the other pair so that meat peeled by the higher pair of members may drop down into the nip of the lower pair of members, means associated with at least one member of the higher pair for forming a gap between the members of the higher pair through which the peeled meat may drop down into the nip of the lower pair of members, a movable member between the pairs of peeling members adapted to receive the hulls from the upper pair of peeling members, and means operatively associated with said movable member for moving it to a position in which the meat may fall down into the nip of the lower peeling members when the upper peeling members are in gap forming relation.

References Cited in the file of this patent

UNITED STATES PATENTS

| | | |
|---|---|---|
| Re. 4,388 | Aspinwall | May 23, 1871 |
| 1,966,871 | Serre | July 17, 1934 |
| 2,180,567 | Urschel | Nov. 21, 1939 |
| 2,295,755 | Powell | Sept. 15, 1942 |
| 2,574,044 | Lapeyre et al. | Nov. 6, 1951 |
| 2,663,897 | Greiner et al. | Dec. 29, 1953 |